United States Patent Office 3,554,828
Patented Jan. 12, 1971

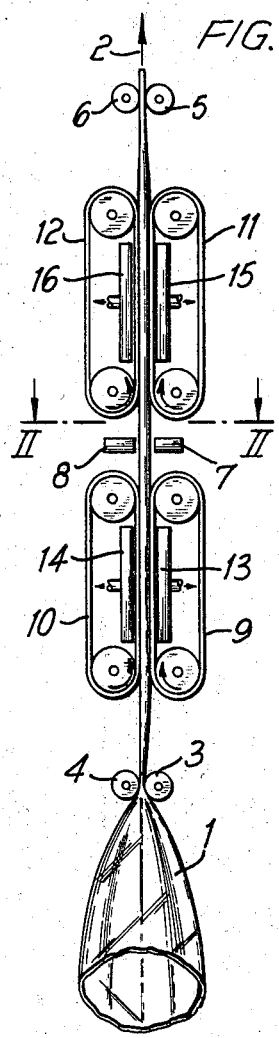
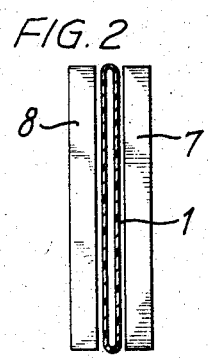
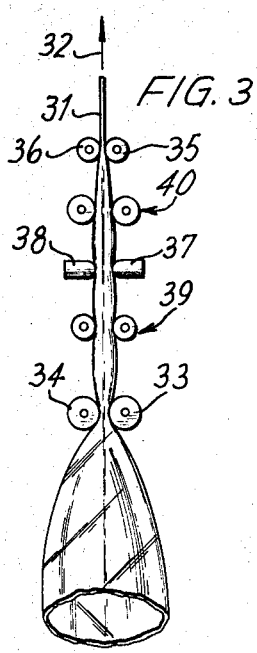
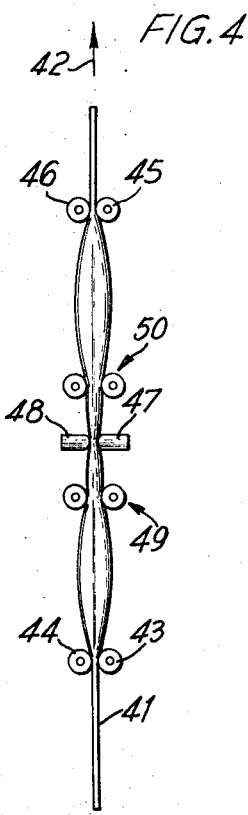

3,554,828
PROCESS FOR THE MANUFACTURE OF BONDED PLASTIC SACKS EMPLOYING AN ELECTRICAL FIELD AND AN IONIZABLE GAS
Herbert Schmedding and Helmut Helbig, Lengerich, Germany, assignors to Windmoller & Holscher, Lengerich, Germany
Filed Jan. 3, 1967, Ser. No. 607,021
Claims priority, application Germany, Feb. 14, 1966, W 40,937
Int. Cl. B29c *17/00*
U.S. Cl. 156—156                                    5 Claims

ABSTRACT OF THE DISCLOSURE

A process for the manufacture of sacks made of plastic material. The process consists of the following steps: forming a continuous tube of plastic material and then filling the tube with an ionizable gas to separate the inside surfaces thereof; moving the continuous tube longitudinally through a pretreating electric field and ionizing the gas inside of the tube to activate the internal surfaces thereof; severing the tube into sections when the internal surfaces have been activated and opening the tube section ends and then applying an adhesive to the interior of said tube section ends and adhesively joining same.

---

This disclosure describes the manufacture of adhesively bonded sacks of plastic material from tubes and has special application to the manufacture of such sacks having adhesively bonded bottoms. Inside and outside surfaces of the tube are joined by a plastic material adhesive which forms cross-links to the tube material, and are pretreated by a movement of the continuous tube through an electric field. The pretreatment of the inside surfaces of the tube is effected by moving the continuous tube through a pretreating electric field while the inside surfaces of the tube are separated by a filling of an ionizable gas.

It is known, e.g., from the French patent specification No. 1,395,952, that the strength of adhesive joints established between plies of polyethylene sheeting by novel plastic material adhesives is improved or even enabled by a surface-activating pretreatment. A pretreatment by a corona discharge of electric high-frequency energy is preferred. In the manufacture of sacks from continuous tubes of plastic material by a formation of adhesive joints, portions of the outside and inside surfaces of the tube must be superimposed, and it has not been possible to introduce a pretreating device into the interior of the moving tube in order to pretreat its inside surfaces, as the leads cannot be extended through the tube. For this reason it was not possible to use the inside surfaces of the tube in forming the adhesive joints so that the manufacturing costs were much increased.

The above-mentioned French patent specification relates to the manufacture of crossed-bottom sacks of polyolefins and suggests to adhere the outside surface of the crossed bottom to a thick bottom sheet as the formation of a strong adhesive joint with the inside surface of one of the side flaps of the bottom is not possible. When a large overlap of the side flaps of the bottom is desired in spite of the use of the bottom sheet, the outer side flap of the bottom must have relatively large apertures in order to enable an adhering also of the inner side flap of the bottom to the bottom sheet, which covers the outer side flap of the bottom. Nevertheless, the adhesive joint is not satisfactory because it does not extend throughout the surface and because it can be established only with the aid of the bottom sheet.

On the other hand, the tube can be longitudinally cut open to form a single-ply web, which may then be pre-treated on both sides. A tube having pretreated inside surfaces may then be formed from such web by a provision of adhesive lap joints or of an extruded seam or by heat sealing. It will be apparent that this process ensures the formation of the desired, strong adhesive joint at the bottom but requires a disproportionately high structural expenditure.

It is an object of the invention to provide a process, and an apparatus for carrying out such process, which enables the manufacture of durable sacks of plastic materials which comprise bottoms adhesively joined by a plastic material adhesive, which is applied to electrically activated sheeting surfaces and is cross-linked to the activated surfaces, which sacks are made from continuous tubes, without an unduly high expenditure of apparatus and material. According to the invention, this object is accomplished in that the continuous tube of plastic material is moved through the pretreating electric field while the inside surfaces of the tube are separated from each other by a filling of an ionizable gas, sections are severed from the tube when the inside and outside surfaces have been activated, the tube section ends are pulled open, provided with the adhesive and adhesively joined. To overcome the difficulty which resides in that the interior of a continuous tube of plastic material is not accessible to apparatus elements, particularly for a supply of high-frequency current by means of the usual leads, the invention utilizes the recognition that in the known use of the corona discharges for pretreating plastic material sheeting an activation is effected only at the interfaces between the sheeting and gases or gas mixtures which are ionized in an electric field. More particularly, the invention is based on the recognition that the inside surfaces of the tube of plastic material will also be pretreated if such gases are present in sufficiently large amounts in the interior of the tube.

The invention avoids the use of complicated additional processes involving an additional structural expenditure. Such processes may involve a cutting open of the tube to a single-ply sheeting and the reforming of a tube, as well as an increased material expenditure by a bottom cover sheet, which would be required for a strong adhesive joint at the bottom if only the outside surfaces were pretreated.

In a further embodiment of the invention, the gas filling consists suitably of air which contains water vapor. It is known that absolutely dry air cannot be ionized.

To prevent the latent danger of blocking due to the formation of polar groups of molecules at the surface of the tube, the plastic material may incorporate lubricants, which dissolve in the solvent of the adhesive and/or form chemical bonds with the subsequently employed adhesive, so that they are incorporated in the film-forming substance of the adhesive. Where adhesives which are cross-linkable to isocyanates are employed, these lubricants may contain OH groups, $NH_2$ groups or COOH groups, which groups react with the isocyanate with formation of polyurethanes. Lubricants consisting of amines or acid anhydrides are used with epoxy resins.

An apparatus for carrying out the process according to the invention may be provided, in the station for pretreating the inside surfaces of the tube, with guide means for guiding the flattened tube with its inside surfaces slightly spaced apart whereas the tube is passed between pinch rolls at the exit from said station. A flattened condition of the tube is required so that the distance between the electrodes need not be so large that the formation of a sufficiently strong electric field is in question. The pinch rolls at the exit from the pretreating station prevent the gas volume, which is enclosed in the tube, from being rapidly transferred with the moving tube so that the spacing of the inside surfaces of the tube would be endangered.

It is particularly desirable if the station for pretreating the inside surfaces closely succeeds the extruder for producing the tube in the direction of travel and a pair of guide rolls for flattening the tube are provided at the entrance to said station. The nip between said guide rollers is suitably adjustable so that the rate at which the pretreating station is entered by air, which is constantly blown into the tube by the extruder, can be controlled as desired.

Alternatively, pairs of pinch rolls which enclose the gas filling may be provided at the entrance to and exit from the station for pretreating the inside surfaces. This will be required if the pretreating station does not directly succeed an extruder so that the gas volume must be separately introduced into the tube and must be enclosed in the pretreating station. As a slight loss of gas with the moving tube cannot be precluded, gas may be added from time to time through an opening formed for this purpose in the tube.

According to the invention, the tube may be vertically guided in the station for pretreating the inside surfaces. This arrangement avoids an action of forces due to gravity transverse to the tube as such forces would adversely affect an exact guidance of the tube plies in a spaced relation.

The tube plies may be guided by pairs of vacuum conveyor belts, which respectively precede and succeed the pretreating electrodes, which are disposed between the pairs of vacuum conveyor belts and spaced from the outside surfaces of the tube. In this case the inside and outside surfaces are pretreated in one station and it will be particularly desirable if the succeeding pair of vacuum belt conveyors revolve at a somewhat higher speed than the preceding pair because the tube will then be tensioned between the pairs of belts so that the desired configuration of the tube is maintained also between the pairs of belts in the range of action of the electrodes. Alternatively, the tube may be guided by the electrodes themselves, which in this case contact the outside surfaces of the tube. The arrangement avoids the somewhat more complicated guidance which has been described hereinbefore and involves a spacing on the inside and outside. The guiding surfaces of the guiding electrodes are suitably rounded to avoid damage to the tube. If the tube is guided by the electrodes themselves, only the inside surfaces will be pretreated and a separate station, in which the tube is no longer gas-filled, is required for pretreating the outside surfaces.

The invention will now be explained more fully with reference to the drawing, which shows by way of example embodiments of stations for internal treatment in apparatus according to the invention.

In the drawing,

FIG. 1 is a diagrammatic side elevation of a pretreating station which closely succeeds an extruder and serves for a simultaneous internal and external pretreatment of a continuously moving tube of plastic material produced by the extruder, FIG. 2 is a sectional view taken on line II—II of FIG. 1, FIG. 3 is a diagrammatic side elevation of a pretreating station which also closely succeeds an extruder and serves for an internal pretreatment of the inflated tube of plastic material, and FIG. 4 is a diagrammatic side elevation showing a station for an internal pretreatment of a continuously moving flattened tube of plastic material.

The tube 1 of plastic material sheeting is moved in the direction of the arrow 2 through the apparatus, e.g., from bottom to top. A vertical travel from bottom to top or from top to bottom is preferred because such an arrangement will avoid an action of forces of gravity transverse to the tube. Such forces would adversely affect an exact guidance of sheeting plies, which are spaced apart and from the pretreating electrodes. At the entrance end of the apparatus, a preferably driven pair of pinch rolls 3, 4 are provided. The nip between these rolls is suitably adjustable. By these rolls, the air-filled tube coming from the extruder is advanced and simultaneously pinched to such an extent that the small amount of air in the flattened tube is maintained in the area which succeeds the pair of pinch rolls so that this amount of air keeps the two plies of the tube apart from each other, as is required according to the invention.

When a flattened tube is fed to the apparatus, the pinch rolls need not be adjustable and define one limit for this small amount of air or gas.

Correspondingly driven pinch rolls 5, 6 are disposed at the exit end of the apparatus to limit the air filling and deliver the entirely flattened tube, which has been pretreated internally and externally. Midway between the pairs of rolls 3, 4 and 5, 6, electrodes 7, 8 are provided which serve for generating a corona discharge from one electrode to the other. The considerably flattened tube of plastic material is moved between these electrodes so that the plies of the tubes are spaced apart and from the electrodes. This movement is effected by pairs of conveyor belts 9, 10 and 10, 11, which respectively precede and succeed the electrodes and maintain the required spacing. These belts are apertured in known manner and their courses which face the tube plies are guided over vacuum boxes 13–16, which are formed with slots, not shown. These slots are covered by the belts so that the vacuum acts on the tube plies owing to the cooperation between these slots and the apertures in the webs. As a result, the tube plies are spaced apart and maintained in a flat condition.

This configuration of the tube 1 is shown in section in FIG. 2. To maintain this configuration between the pairs of conveyor belts, particularly adjacent to the electrodes 7 and 8, the invention proposes that the pairs of conveyor belts move at different velocities so that the succeeding pair of conveyor belts 11, 12 revolve at a higher speed than the preceding pair. As a result, the tube is tensioned between the pair of belts so that the desired configuration of the tube between the pairs of belts is maintained. The tube plies are thus spaced apart from the electrodes, as required, so that an internal and external pretreatment of the tube is effected. Within the scope of the invention, the internal and external pretreatments may be separately effected. In this case, the external pretreatment is carried out in a manner known per se. Within the scope of the invention, an internal pretreatment of a tube of plastics material, without a simultaneous pretreatment of its external surfaces, is effected in that the tube is moved between the electrodes while its flattened plies are properly spaced apart whereas there is no spacing between the tube plies and the electrodes. In this case there will be a corona discharge only in the interior of the tube, which is filled with air or gas.

If the internal pretreatment closely succeeds an extruder (FIG. 3), a preferably driven pair of pinch rolls 33, 34 are again provided at the entrance end of the apparatus, and the nip between said rolls is adjustable so as to meter the transfer of gas or air from the extruder to the tube portion succeeding said rolls. The pinching and advancing device 35, 36 disposed at the exit end of the apparatus limits the amount of gas or air within the apparatus and delivers the entirely flattened tube 31 in the direction of the arrow 32.

The electrodes 37, 38 are disposed between the pairs of pinch and advancing rolls 33, 34 and 35, 36 and contact the outside surfaces of the tube, which is flattened to the desired internal spacing. For this reason, the electrodes are suitably rounded at their surface which contacts the tube. Owing to the superatmospheric internal pressure, the tube walls contact the electrodes so that there is no air gap at this point. Two pairs of backing rollers 39 and 40 support the tube.

The apparatus shown in FIG. 4 is fed with a previously flattened tube 41 of plastic material in the direction of the arrow 42 and has pairs of pinch and advancing rolls 43, 44 and 45, 46 at its entrance and delivery ends, respectively. These pairs of rolls are closed as far as possible. The distance between said pairs of rolls is larger than in the apparatus shown in FIG. 3 so that a larger amount of gas or air can be contained in the tube between the pairs of rolls. Whereas a presence of air or gas is required for the pretreating operation, the consumption of air or gas is very small so that it is sufficient to make up the filling after very long periods by a supply from the outside through a small opening formed for this purpose in the tube. In other respects, this apparatus is similar to that of FIG. 3 and has two electrodes 47 and 48 having rounded effective surfaces, and two pairs of backing rollers 49 and 50.

The internal pretreatment of a previously flattened tube at a later stage, when the tube has cooled from the elevated temperature which is due to the extrusion, may afford the advantage that any blocking of the tube plies due to the pretreatment is avoided whereas such blocking is promoted by the higher temperature of the tube immediately after the extrusion.

What is claimed is:

1. A process for the manufacture of sacks made of plastic material, the steps comprising:
   forming a continuous tube of plastic material;
   filling the tube with an ionizable gas to separate the inside surfaces thereof;
   moving the continuous tube longitudinally through a pretreating electric field;
   ionizing the gas inside of said tube at said pretreating electric field to activate the internal surfaces of the tube;
   severing the tube into sections when the internal surfaces have been activated;
   opening the tube section ends; and
   applying an adhesive to the interior of said tube section ends and adhesively joining same.

2. A process according to claim 1, wherein the ionizable gas consists of air which contains water vapor.

3. A process according to claim 1, wherein the plastic material incorporates lubricants, which dissolve in the solvent of the adhesive and/or form chemical bonds with the subsequently used adhesive.

4. A process according to claim 3, wherein the adhesives are cross-linkable to isocyanates and the lubricants contain OH groups, $NH_2$ groups or COOH groups.

5. A process according to claim 3, wherein epoxy adhesives are employed and amines or acid anhydrides are used as lubricants.

References Cited

UNITED STATES PATENTS

| | | | |
|---|---|---|---|
| 2,762,421 | 9/1956 | Quinche et al. | 156—198 |
| 2,936,816 | 5/1960 | Lang | 156—198X |
| 3,157,560 | 11/1964 | Livingston et al. | 156—272X |
| 3,290,198 | 12/1966 | Lux et al. | 156—198 |
| 3,355,337 | 11/1967 | Zelnick | 156—272X |

CARL D. QUARFORTH, Primary Examiner

S. J. LECHERT, JR., Assistant Examiner

U.S. Cl. X.R.

156—198, 272, 330